US00RE46968E

(19) United States
(12) Reissued Patent
Linville

(10) Patent Number: US RE46,968 E
(45) Date of Reissued Patent: Jul. 24, 2018

(54) EVALUATING COMMODITY CONDITIONS USING AERIAL IMAGE DATA

(71) Applicant: Archer Daniels Midland Company, Decatur, IL (US)

(72) Inventor: Charles Linville, Champaign, IL (US)

(73) Assignee: Archer Daniels Midland Company, Decatur, IL (US)

(21) Appl. No.: 14/966,829

(22) Filed: Dec. 11, 2015

Related U.S. Patent Documents

Reissue of:
(64) Patent No.: 8,965,812
Issued: Feb. 24, 2015
Appl. No.: 12/248,110
Filed: Oct. 9, 2008

U.S. Applications:
(60) Provisional application No. 60/978,550, filed on Oct. 9, 2007.

(51) Int. Cl.
*G06F 17/00* (2006.01)
*G06G 7/00* (2006.01)
*G06Q 10/02* (2012.01)
*G06Q 50/00* (2012.01)

(52) U.S. Cl.
CPC ..... *G06Q 50/00* (2013.01); *G06Q 10/02* (2013.01)

(58) Field of Classification Search
CPC ..... G06Q 50/00; G06Q 10/02; G01C 21/20; G01C 21/30
USPC ..... 705/400; 702/5; 382/110
See application file for complete search history.

(56) References Cited

U.S. PATENT DOCUMENTS

| | | | | |
|---|---|---|---|---|
| 4,654,466 | A * | 3/1987 | Lindsey | 800/271 |
| 5,604,534 | A * | 2/1997 | Hedges et al. | 348/144 |
| 5,894,323 | A * | 4/1999 | Kain et al. | 348/116 |
| 2003/0130767 | A1* | 7/2003 | Carroll | 701/3 |
| 2004/0264761 | A1* | 12/2004 | Mas et al. | 382/154 |
| 2006/0074560 | A1* | 4/2006 | Dyer | A01B 79/005 702/5 |
| 2006/0139375 | A1* | 6/2006 | Rasmussen et al. | 345/641 |
| 2006/0213167 | A1* | 9/2006 | Koselka et al. | 56/10.2 A |
| 2008/0304711 | A1* | 12/2008 | Scharf | A01C 21/007 382/110 |

OTHER PUBLICATIONS

Tsuyoshi Akiyama, etal., "Monitoring and predicting crop growth and analysing [sic] agricultural ecosystems by remote sensing," Agricultural and Food Science in Finland, vol. 5, 1996, pp. 367-376.
Alma Delia Baez-Gonzalez, et al, "Using Satellite and Field Data with Crop Growth Modeling to Monitor and Estimate Corn Yield in Mexico," Crop Science, 42, 2002, pp. 1943-1949.

(Continued)

*Primary Examiner* — Beverly M Flanagan
(74) *Attorney, Agent, or Firm* — Banner & Witcoff, Ltd.

(57) ABSTRACT

Various tools, strategies and techniques are provided for evaluating the condition of one or more commodities in one or more regions of interest. Collection of image data associated with the commodities can be facilitated through use of an aircraft traveling a predetermined travel route over the regions of interest. The collected image data may be analyzed to evaluate the condition of the commodities, forecast commodity production, and/or to perform other tasks.

41 Claims, 3 Drawing Sheets

(56) References Cited

OTHER PUBLICATIONS

Luciana Miura Sugawara Berka, et al, "Soybean Yield Estimation by an Agrometeorological Model in a GIS," Scientia Agricola, vol. 60, Jul./Sep. 2003, pp. 433-440.
Catherine Champagne, et al., "Exploiting Spectral Variation from Crop Phenology for Agricultural Land-Use Classification," Remote Sensing and Modeling of Ecosystems for Sustainability II, Wei Gao, David R. Shaw (eds.), Proc. of SPIE, vol. 5884, 2005, Bellingham, WA, pp. 588405-1 thru 588405-9.
Cong Pifu, et al., "Study on method of extracting winter wheat area planted based on spectral features using Terra/MODIS," SAR and Multispectral Image Processing, Liangpei Zhang, Jianqing Zhang, Mingsheng Liao (eds.), vol. 6043, 2005, pp. 604303-1 thru 604303-8.
M. J. Hayes, et al, "Using NOAA AVHRR data to estimate maize production in the United States Corn Belt," International Journal of Remote Sensing, vol. 17, No. 16, 1996, pp. 3189-3200.
L. Zhu, et al., "Fusion of multi sensor multi temporal satellite data for land cover mapping," International Journal of Remote Sensing, vol. 27, Nos. 5-6, Mar. 2006, pp. 903-918.
Suxia Wu, et al., "Spatiotemporal variability of winter wheat condition based on TM data and geostatistics," Remote Sensing and Modeling of Ecosystems for Sustainability II, Wei Gao, David R. Shaw (eds.), Proc. of SPIE, vol. 5884, Bellingham, WA, 2005, pp. 58841G-1 thru 58841G-8.
R.B. MacDonald, et al., "The Use of LANDSAT Data in a Large Area Crop Inventory Experiment (LACIE)," LARS Symposia. Paper 46, 1975, pp. IB-1 thru IB-23.
R.B. MacDonald, "The Large Area Crop Inventory Experiment," 2nd Annual William T. Pecora Memorial Sympsium, Sioux Falls, South Dakota, Oct. 25-29, 1976, pp. 1-21.
U.S. Congress, Office of Technology Assessment, "Civilian Satellite Remote Sensing: A Strategic Approach, OTA-ISS-607," (Washington, DC: U.S. Government Printing Office, Sep. 1994), pp. 1-173.
Jikun Huang, Ruifa Hu, Hans van Meijl, Frank van Tongeren, Biotechnology boosts to crop productivity in China: trade and welfare implications, Journal of Development Economics, vol. 75, Issue 1, Oct. 2004, pp. 27-54, ISSN 0304-3878, DOI: 10.1016/j.jdeveco.2003.07.005. (http://www.sciencedirect.com/science/article/B6VBV-4CMYNXP-1/2/45f358cd7e.*
M. A. Sharifi, "Crop Inventory and production forecasting using remote sensing and agrometorological models: the case of major agricultural commodities in Hamadan Province, Iran", International Archives of Photogrammetry and Remote Sensing, vol. XXXIII, Part B7, Amsterdam 2000.*
J. C. Brown, et al., "Multitemporal, Moderate-Spatial-Resolution Remote Sensing of Modern Agricultural Production and Land Modification in the Brazilian Amazon," *GIScience & Remote Sensing*, 44, No. 2, Jun. 2007, pp. 117-148.
William Teng, et al., "An Interoperable, Agricultural Information System Based on Satellite Remote Sensing Data," Proceedings of the American Society for Photogrammetry and Remote Sensing 2005 Annual Conference, Mar. 7-11, 2005, Baltimore, Maryland, 7 pages.
K. Dabrowska-Zielinska, et al., "Modelling of crop growth conditions and crop yield in Poland using AVHRR-based indices," *International Journal of Remote Sensing*, vol. 23, No. 6, 2002, pp. 1109-1123.
Wim Van Leeuwen, et al., "Assimilating NASA Data into a Crop Production Estimation System: Risk Management," The University of Arizona, Office of Arid Lands Studies, Arizona Remote Sensing Center, Tucson, Arizona, 2005, 4 pages.
J. Ronald Eastman, "IDRISI Andes Guide to GIS and Image Processing," Apr. 2006, Clark Labs, Clark University, Worcester, MA, 328 pages.
E. A. Enclona, et al., "Within-field wheat yield prediction from IKONOS data: a new matrix approach," *International Journal of Remote Sensing*, vol. 25, No. 2, Jan. 20, 2004, pp. 377-388.
Kevin Gallo, et al., "Multi-platform comparisons of MODIS and AVHRR normalized difference vegetation index data," *Remote Sensing of Environment*, 99, 2005, pp. 221-231.
Manfred Prantl, et al., "Active Fusion Using Bayesian Networks Applied to Multi-Temporal Remote Sensing Imagery," Proceedings of International Conference on Pattern Recognition, 1996, pp. 890-894.
Peter Van Der Puttan, et al., "Data Fusion Through Statistical Matching," MIT Sloan School of Management, Paper 185, Jan. 2002, 13 pages.
Peter Van Der Puttan, et al., "Data Fusion Through Statistical Matching," MIT Sloan School of Management, Working Paper 4342-02, Jan. 2002, 13 pages.
D. Jiang, et al., "An artificial neural network model for estimating crop yields using remotely sensed information," *International Journal of Remote Sensing*, vol. 25, No. 9, 2004, pp. 1723-1732.
David B. Lobell, et al., "Remote sensing of regional crop production in the Yaqui Valley, Mexico: estimates and uncertainties," *Agriculture, Ecosystems and Environment*, 94, 2003, pp. 205-220.
V. I. Lyalko, et al., "The experience of application of NOAA AVHRR and Landsat-7 data for cereal crop yield forecasting," *Geoinformation for European-wide Integration*, Benes (ed.) 2003, Millpress, Rotterdam, pp. 567-572.
Edmond Nezry, et al., "Retrieval of Environmental and Geophysical Parameters Through Bayesian Fusion of ERS and Radarsat Data," Proc. of 3d ERS Symposium on Space at the service of our Environment, Florence, Italy, Mar. 17-21, 1997, European Space Agency, pp. 119-122, 5 pages.
Francis Yakam-Simen, et al., "Early Estimation of Crop Surfaces, and Agriculture Monitoring Using Radarsat Data," Geoscience and Remote Sensing Symposium, 1999, IGARSS 1999 Proceedings, IEEE 1999 International, vol. 2, pp. 788-790.
M. S. Rasmussen, "Developing simple, operational consistent NDVI-vegetation models by applying environmental and climatic information. Part II: Crop yield assessment," *International Journal of Remote Sensing*, vol. 19, No. 1, 1998, pp. 119-139.
C. Royo, et al., "Usefulness of spectral reflectance indices as durum wheat yield predictors under contrasting Mediterranean conditions," *International Journal of Remote Sensing*, vol. 24, No. 22, Nov. 20, 2003, pp. 4403-4419.
P. V. Krishna Rao, et al., "Remote Sensing: A Technology for Assessment of Sugarcane Crop Acreage and Yield," *The World's Knowledge, Sugar Tech*, vol. 4, 2002, pp. 97-101.
E. Raymond Hunt Jr., et al., "Evaluation of Digital Photography from Model Aircraft for Remote Sensing of Crop Biomass and Nitrogen Status," *Precision Agriculture*, No. 6, 2005, pp. 359-378.

* cited by examiner

EVALUATING COMMODITY CONDITIONS USING AERIAL IMAGE DATA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION/PRIORITY CLAIM

The present application claims the benefit of U.S. Provisional Patent Application Ser. No. 60/978,550, filed on Oct. 9, 2007, the entirety of which is hereby incorporated by reference.

FIELD OF THE INVENTION

The invention generally relates to evaluating the condition of various commodities. The invention more particularly relates to collecting image data associated with commodities with an aircraft to evaluate the condition or growth of commodities.

BACKGROUND

For entities that depend on commodities in their commercial endeavors, it is critical to understand the factors that affect the development, procurement and use of commodities. For example, producers and purchasers of grain and other types of growing crops need to track, evaluate and manage factors such as seasonal changes, weather conditions, infestation, and other conditions that may affect the viability and available supplies of such crops. The tools and techniques employed to monitor commodities are generally insufficient, however, for performing effective and efficient evaluations of commodity condition.

For example, aerial photography is one way to monitor commodity conditions, such as the growth of grain or other crops. An aircraft can be flown along a travel route over a geographic area containing crops, and photographs of the crops can be taken at a discrete set of sampling locations along the route of the aircraft. The time and energy that the aircraft spends in transit between different sampling locations is often wasted, however, because no structured data collection or evaluation of crop condition occurs during this transit time. In addition, there is usually no analytical approach to planning and executing the travel route to be taken by the aircraft across the geographic area of interest.

In view of the foregoing issues, more effective strategies, tools and techniques are needed to improve the ability of commodity producers and commodity purchasers, among others, to evaluate commodity conditions.

BRIEF DESCRIPTION OF THE FIGURES

The utility of the embodiments of the invention will be readily appreciated and understood from consideration of the following description when viewed in connection with the accompanying drawings, wherein FIG. 1 includes a process flow diagram illustrating various exemplary aspects of methods for evaluating commodity condition in accordance with embodiments of the invention.

DESCRIPTION

Figure 1:
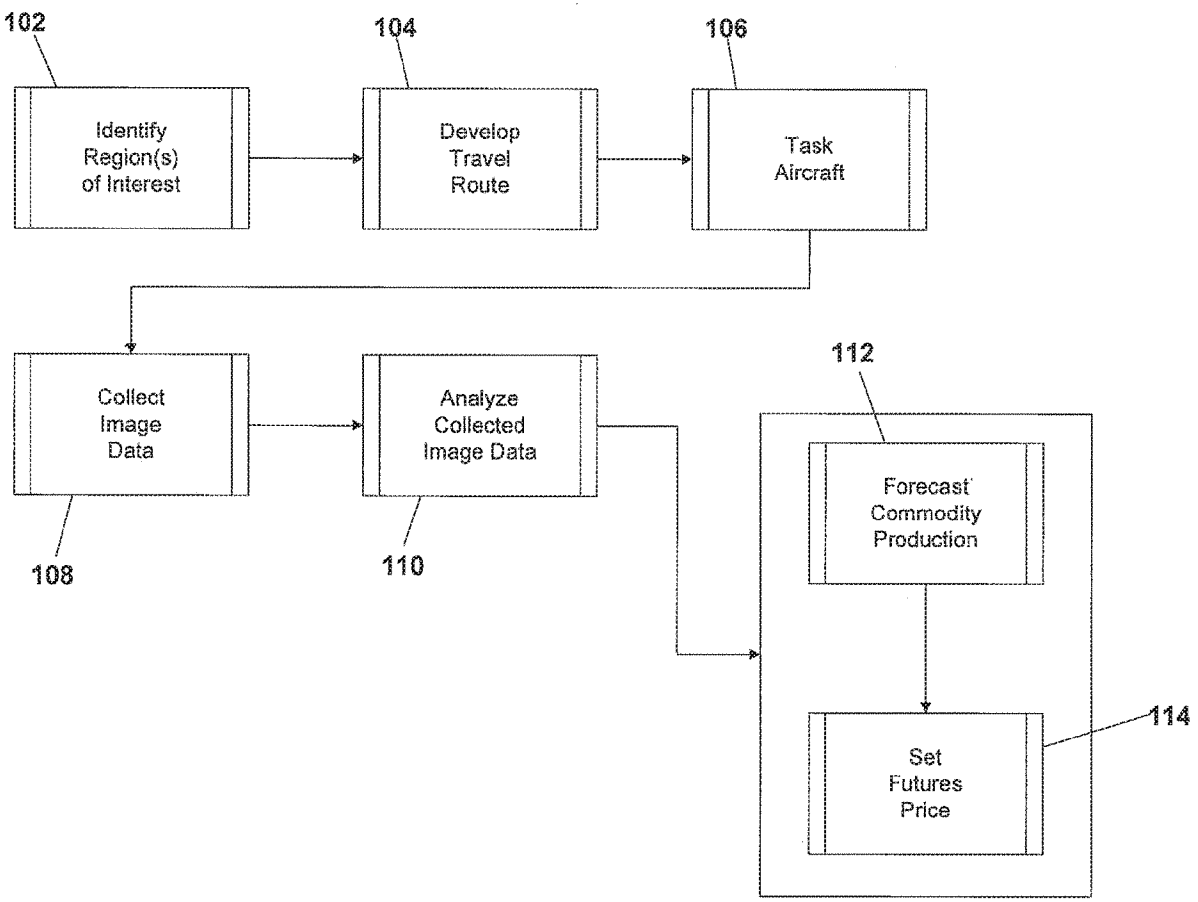

As applied herein, the term "commodity" may include any product or service considered a commodity by those skilled in the art. Examples of commodities suitable for application of embodiments of the invention include, without limitation, grain, corn, soy beans, cotton, wheat, cocoa, grain sorghum, sunflower, plants, and/or other agricultural products. Different types of crops, for example, are used herein to illustrate various embodiments of the invention, but other kinds of commodities may be equivalently applied within the scope of the invention.

The term "condition" as applied to various commodities, or the environments in which the commodities are located, can include, for example and without limitation, various degrees or states of growth, lack of growth, aridity, infestation, contamination, destruction (e.g., as may be caused by fire, floods, or other natural or man-made disasters), rust, readiness for harvest, soil condition, and/or many other conditions of the commodities or the environments in which they are located.

The term "aircraft" includes any vehicle or craft capable of facilitating the collection of images and data for commodities as described herein with respect to various embodiments of the invention. Examples of potentially suitable "aircraft" include, without limitation, airplanes, jets, hang gliders, hovercraft, balloons, drones, hydrofoils, and many other vehicles or crafts, whether manned or unmanned, that can be elevated over a commodity such as a crop.

Embodiments of the invention may offer improved forecasts of the supply and demand of commodities in various geographic locations. With particular regard to agricultural commodities or crops, for example, such forecasts are valuable for planning commodity production, harvest, and transportation needs. The forecasts may help commodity producers and purchasers to decide where to move rail cars or other transportation vehicles into place, for example, prior to harvest based on estimated crop yields in various parts of a region. In addition, with regard to commodity trading, enhanced forecast data can be valuable for setting futures prices and executing effective trades in agricultural commodities markets.

Challenges associated with evaluating agricultural commodity markets include knowing what kinds and quantities of different crops that have been planted, and estimating what the yield of the crops will be at harvest time. Embodiments of the invention leverage remote sensing techniques such as collecting photographic image data and other information to obtain and analyze information affecting crop conditions across many different geographic regions. In various embodiments, aerial photography may be employed, instead of comparatively more expensive and less efficient tools and techniques (e.g., satellite imagery), to obtain image data with a useful degree of resolution. In addition, in association with using aerial photography, adjustments and other decisions can be made while an aircraft travels along its travel route, such as avoiding cloud cover over a certain region of interest, for example.

Through conception and development of the invention, it has been discovered that an aircraft can proceed in a travel route over a commodity producing region (e.g., a geographic area in which crops are planted) and collect imagery of the region continuously or substantially continuously, rather than executing the sampling scheme at only a limited number of discrete locations or times. Use of continuous or substantially continuous image sampling can facilitate quantitative assessment of commodity conditions across a geographic region through the collection of a comparatively larger sample of image data, for example.

Figure 2:
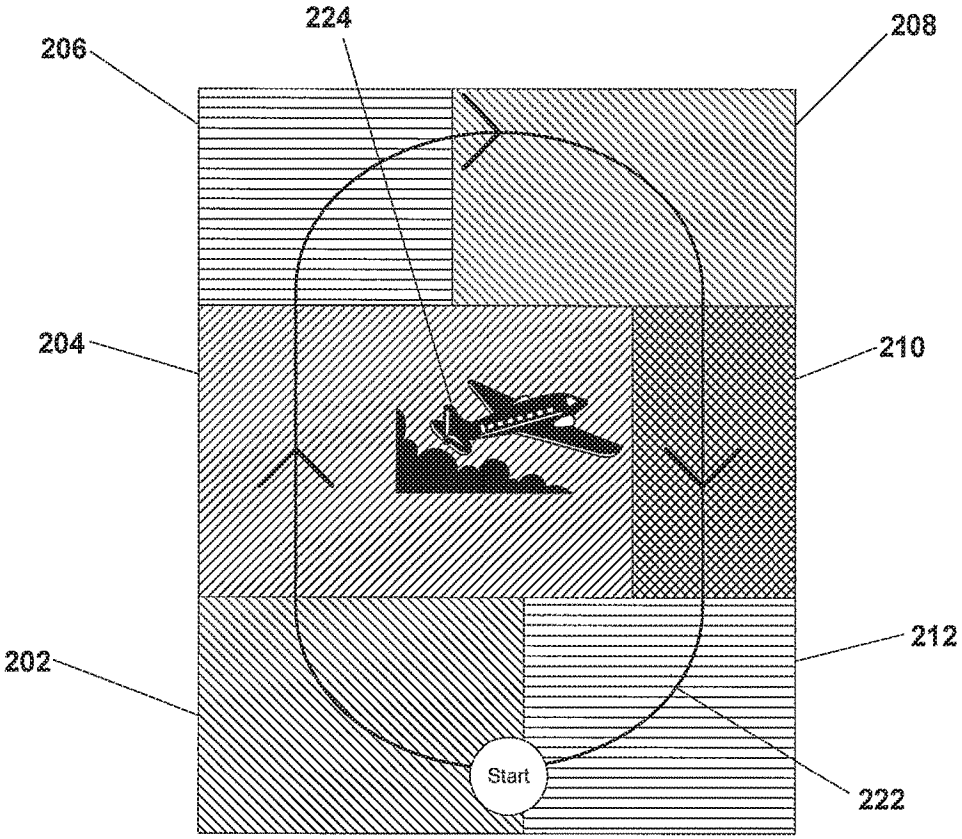
FIG. 2 includes a schematic illustrating an example of a travel route that may be traveled by an aircraft over one or more regions of interest including one or more commodities; and, FIG. 3 includes a schematic system diagram of an image data acquisition system structured in accordance with various embodiments of the invention.
Figure 3:
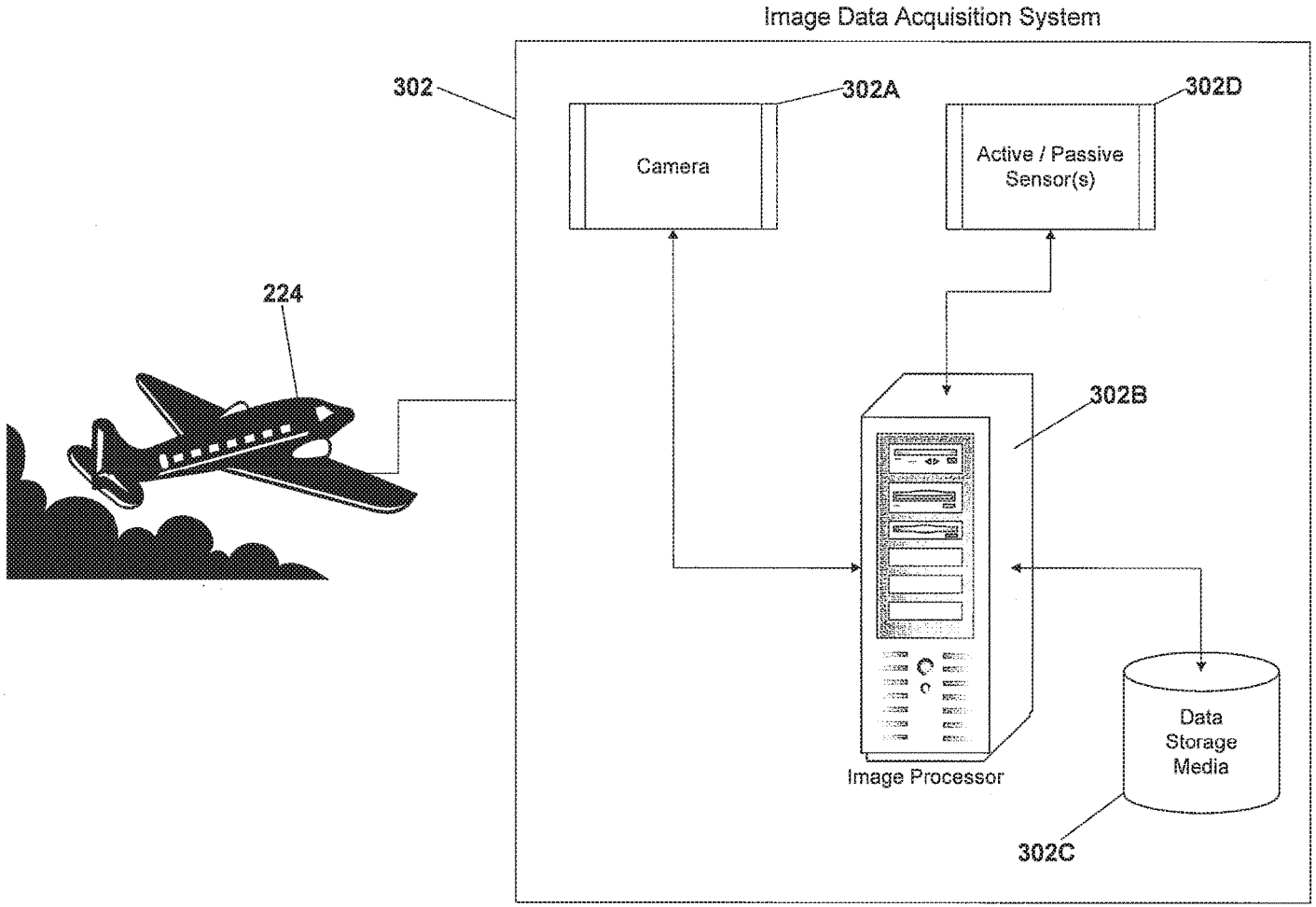

With reference to FIGS. 1 through 3, illustrative examples of a method and system for evaluating the condition of a commodity are provided. At step 102, a region or regions of interest 202-212 that include one or more types of commodities therein can be identified. In general, a region of interest can be any geographic location or area from which a commodity or commodities can be grown, produced, or otherwise derived. Such regions of interest may include, for example, areas of land, farms, water, marshes, swamps, mountains, or other natural or manmade areas suitable for locating commodities such as crops.

At step 104, a travel route 222 can be developed in association with tasking an aircraft 224 at step 106 to travel over the regions of interest 202-212. In various embodiments, development and execution of the travel route 222 may involve using data or information from a variety of sources to perform an assessment of commodity condition and an understanding of the level of uncertainty of what is known about the commodity condition. The assessment may be employed for planning data acquisition activity, such as image data acquisition and collection, for one or more of the various regions of interest 202-212.

In various embodiments, the development of the travel route 222 may involve consideration or analysis of one or more predefined criteria. For example, criteria can be selected and employed that are predictive of the growth of at least one specified crop or other commodity in a selected geographical region. The defined criteria may also be determined by or factored into an optimization algorithm that may be used to develop the travel route 222. For example, the optimization algorithm may be used to assess a cost of tasking the aircraft at step 106 to travel across the travel route 222 versus the cost of acquiring photographic image data of one or more commodities in the regions of interest 202-212. It can thus be seen that the optimization algorithm may be employed to jointly optimize the cost of gathering image data based at least in part on the cost to operate the aircraft 224, in conjunction with an estimated value of the usefulness of the image data to be collected. In certain embodiments, one or more operations research techniques may be applied to development and calculation of the optimization algorithm.

Other examples of criteria that may be employed to develop or plan the travel route 222 include historical data regarding production of a specified crop or crops in one or more of the regions of interest 202-212; historical data indicative of variability of crop types grown in one or more of the regions of interest 202-212; data indicative of variable production rate of a specified crop in one or more of the regions of interest 202-212; weather data for a selected geographical region or for one or more of the regions of interest 202-212; and/or, many other criteria. In certain embodiments, a generally oval route (as shown in FIG. 2) may be employed as the travel route 222 to minimize cost of tasking the aircraft 224 and collecting image data across the regions of interest 202-212.

In various embodiments, an experimental design approach may be employed for developing the travel route 222 which considers commodity production data and information from a variety of sources. For example, the United States Department of Agriculture National Agricultural Statistics Service (www.usda.gov) publishes agricultural production data on a county-by-county basis that can be used to develop or plan the travel route 222. In certain embodiments, the design and implementation of the travel route 222 may also be affected by emphasizing certain regions of interest 202-212 in the routing algorithm, while deemphasizing other regions of interest 202-212. For example, the travel route 222 may emphasize regions 202-212 of importance in terms of production and deemphasize regions 202-212 with comparatively lower production numbers; emphasize regions 202-212 that are highly variable in their amount of production in view of other regions 202-212 that historical evidence shows are comparatively more consistent in the amount of production; and/or, emphasize areas that may tend to shift from growth of one type of crop to growth of another type of crop over a predetermined time period (e.g., a number of years), and deemphasize areas that are comparatively more consistent with respect to the type of crop produced.

In certain embodiments, various types of satellite imagery may be used to identify the regions of interest 202-212 and/or to develop the travel route 222. For example, satellite imagery obtained from NASA instruments (www nasa.gov) or other sources (e.g., "Google Earth"—www.google.com) may be used to identify patterns in commodity conditions that may assist with identifying the regions of interest 202-212 from which additional information should be gathered. Such satellite image data may be time-stamped with collection times and/or dates, so that determinations of time of year, season, or harvest time, for example, can be associated with the image data.

At step 108, the method may include acquiring image data or a dataset of images as the aircraft 224 travels along the travel route 222 over the commodity or commodities within the regions of interest 202-212. As shown in FIG. 3, the aircraft 224 may be equipped with an image data acquisition system 302 comprising a camera 302A operatively connected to an image processor 302B or another computer system and to one or more data storage media 302C configured to receive and store collected image data. The camera 302A may be provided as a digital camera, for example, and/or other photographic equipment suitable for image data collection in accordance with embodiments of the invention, as known to those skilled in the art. In certain embodiments, one or more active or passive sensors 302D may be employed to collect and assess image data indicative of commodity condition. Examples of active sensors include sensors that employ microwaves, radar, or infrared spectroscopy to detect commodity conditions, among others. For example, infrared spectroscopy can be employed to determine the oil content, starch content, or protein content of a given crop type commodity. Also, a sensor 302D that uses probing radiation to collect a signal reflected from a commodity in the regions of interest 202-212 may provide an indication of the particular crop species, characteristics of the crop, condition of the soil, and/or various other conditions.

The image data may be collected as the aircraft 224 travels over one or more regions of interest 202-212 in which commodities such as growing crops may be located. In various embodiments, time image data are collected continuously or substantially continuously as the aircraft 224 progresses in its travel along the travel route 222. The image data may be collected sequentially as the aircraft 224 travels along the route 222, and the dataset of sequential images may be of sufficient number to image a footprint of the regions of interest 202-212. The footprint may represent a percentage of the total area of the regions of interest 202-212. The collected image data may comprise, for example, photographic images, hyperspectral images, and/or infrared images. The image data may be collected continuously or substantially continuously in the form of multiple still images, for example, of at least portions of commodities in the regions of interest 202-212. In various embodiments, an image data collection frequency can be calculated and employed for collection of image data based on a number of factors including, for example and without limitation, speed of the aircraft 224, desired resolution of the image data, altitude of the aircraft 224 as it travels over the regions of interest 202-212, type of camera 302A and/or photographic equipment employed by the acquisition system 302, data storage capacity of the data storage media 302C, and/or other factors. It can be appreciated that the image data collection frequency can be designed to obtain coverage of the regions of interest 202-212 sufficient to analyze the condition of the commodity or commodities in the regions of interest 202-212.

In certain embodiments, resolution of the image data may be provided in the range from about 250 m by 250 m to 1 m by 1 m, for example, or at higher or lower resolution. In general, image resolution may depend on the photographic equipment employed by the acquisition system 302, and/or the altitude of the aircraft 224 as it travels along the travel route 222. In addition, it can be appreciated that a balance between the imaged footprint and resolution may need to be made based on various kinds of remote sensing techniques that may be employed by the acquisition system 302. At higher altitudes the aircraft 224 may be able to capture a comparatively larger footprint area, for example, but this may be accomplished at the expense of higher image resolution. In various embodiments, the aircraft 224 may travel at an altitude of 30 meters or less, for example, along the travel route 222.

In various embodiments, the image data collected from commodities in the regions of interest 202-212 may be derived from light in the visible range, from light in the hyperspectral range, and/or from light in the infrared range, among other wavelengths or frequencies of detected light. For example, hyperspectral photographic instruments may detect light in the range of 256 different frequency bands, for example, which may provide detailed information about the condition of a commodity imaged by the acquisition system 302. In certain embodiments, the data acquisition system 302 can be configured to identify collected light spectral bands with a particular type of commodity, such as a particular type of crop (e.g., corn or soybeans), or a particular condition of the commodity (e.g., rust). To distinguish among different commodities, it may be useful to employ intertemporal image data, or image data collected at a number of different times. Changes in image patterns across time can be analyzed to distinguish between or among different commodities. For example, such crop data layer assessments can be conducted in accordance with tools and techniques employed by the USDA (www.usda.gov).

At step 110, the method may include analyzing the collected image data to identify the commodity or commodities and at least one characteristic predictive of the production rate of that crop in the selected geographical area or regions of interest 202-212.

At step 112, the collected and analyzed image data may be used to facilitate forecasting commodity or crop production in a specified geographic region or one or more portions of the regions of interest 202-212. This may include forecasting overall production of a particular crop or commodity for a selected geographical region. The forecasted commodity production information may be provided to one or more customers, such as crop producers, crop sellers, crop buyers, crop brokers, crop distributors, elevator operators, commodities brokers, futures buyers, futures sellers, futures brokers, and/or a variety of other customers. At step 114, the method may include setting a futures price for a specified crop or commodity based at least in part on the forecasted production information.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, wireless phone, smart phone, cable box, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described herein.

What is claimed is:

1. A method for evaluating the condition of an agricultural commodity and forecasting the production thereof in a geographical region of interest, the method comprising:

identifying one or more geographical regions of interest, wherein the geographical region of interest comprises a plurality of different locations that historically have been sites for production of the agricultural commodity;

obtaining an aircraft equipped with an image data acquisition system capable of collecting data;

tasking an aircraft to fly along a travel route that is developed so that the aircraft travels across the regions of interest wherein the travel route is based on the consideration of historical data regarding production of a specified crop in one or more of the regions of interest;

tasking the aircraft to fly along the travel route over the plurality of different locations and having the aircraft collect a plurality of sequential image data over the plurality of different locations crossed over by the travel route;

using an image processing device to analyze the collected image data to determine at least one of a type and a condition of one or more commodities in the geographical region of interest; and forecasting the production of the agricultural commodity in the geographical region of interest based on the determined type and condition;

*wherein developing the travel route further comprises using an optimization algorithm to access a cost of tasking the aircraft to travel across the travel route versus the cost of collecting the image data;*

*wherein developing the travel route further comprises considering weather data for at least a portion of one or more of the regions of interest while the aircraft travels along its travel route.*

2. The method of claim 1, wherein developing the travel route further comprises consideration of one or more criteria that are predictive of the growth of at least one crop in the regions of interest.

[3. The method of claim 1, wherein developing the travel route further comprises using an optimization algorithm to assess a cost of tasking the aircraft to travel across the travel route versus the cost of collecting the image data.]

4. The method of claim 1, wherein developing the travel route further comprises considering historical data indicative of variability of crop types in one or more of the regions of interest.

5. The method of claim 1, wherein developing the travel route further comprises considering data indicative of a variable production rate of a specified crop in one or more of the regions of interest.

[6. The method of claim 1, wherein developing the travel route further comprises considering weather data for at least a portion of one or more of the regions of interest.]

7. The method of claim 1, wherein developing the travel route further comprises emphasizing regions of importance in terms of production and deemphasizing regions with comparatively lower production numbers.

8. The method of claim 1, wherein developing the travel route further comprises emphasizing regions that are highly variable in amount of production in comparison to other regions more consistent in the amount of production.

9. The method of claim 1, wherein developing the travel route further comprises emphasizing regions that shift from growth of one type of crop to growth of another type of crop over a predetermined time period and deemphasizing regions that are comparatively more consistent with respect to the type of crop produced.

10. The method of claim 1, further comprising using satellite imagery for identifying the regions of interest.

11. The method of claim 1, further comprising using satellite imagery for developing the travel route.

12. The method of claim 1, wherein the collected image data comprise image data selected from the group consisting of photographic images, hyperspectral images, and infrared images.

13. The method of claim 1, further comprising calculating an image collection frequency for collecting the plurality of sequential image data during travel over the route.

14. The method of claim 1, further comprising collecting the image data based on a factor selected from the group consisting of speed of the aircraft, desired resolution of the image data, altitude of the aircraft, type of photographic equipment employed to collect the image data, and data storage capacity of one or more data storage media for storing the collected image data.

15. The method of claim 1, further comprising providing the forecasted commodity production information to a customer selected from the group consisting of crop producer, crop seller, crop buyer, crop broker, crop distributor, elevator operator, commodities broker, futures buyer, futures seller, and futures broker.

16. The method of claim 1, further comprising setting a futures price for a specified crop or commodity based at least in part on the forecasted commodity production information.

*17. A method for evaluating the condition of an agricultural commodity, the method comprising:*

*identifying one or more geographical regions of interest, wherein the geographical region of interest comprises a plurality of different locations that historically have been sites for production of the agricultural commodity;*

*obtaining an aircraft equipped with an image data acquisition system capable of collecting data;*

*tasking an aircraft to fly along a travel route that is developed so that the aircraft travels across the regions of interest wherein developing the travel route comprises considering data indicative of a variable production rate of a specified crop in one or more of the regions of interest;*

*tasking the aircraft to fly along the travel route over the plurality of different locations and having the aircraft collect a plurality of sequential image data over the plurality of different locations crossed over by the travel route;*

*using an image processing device to analyze the collected image data to determine at least one of a type and a condition of one or more commodities in the geographical region of interest; and*

*forecasting the production of the agricultural commodity in the geographical region of interest based on the at least one of the determined type and condition;*

*further comprising collecting the image data, while the aircraft travels along its travel route, based on a factor selected from the group consisting of speed of the aircraft, desired resolution of the image data, altitude of the aircraft, type of photographic equipment employed to collect the image data, and data storage capacity of one or more data storage media for storing the collected image data.*

*18. The method of claim 17, wherein developing the travel route further comprises consideration of one or more criteria that are predictive of the growth of at least one crop in the regions of interest.*

*19. The method of claim 17, wherein developing the travel route further comprises using an optimization algorithm to assess a cost of tasking the aircraft to travel across the travel route versus the cost of collecting the image data.*

*20. The method of claim 17, wherein developing the travel route further comprises considering historical data indicative of variability of crop types in one or more of the regions of interest.*

*21. The method of claim 17, wherein developing the travel route further comprises considering weather data for at least a portion of one or more of the regions of interest.*

*22. The method of claim 17, wherein developing the travel route further comprises emphasizing regions of importance in terms of production and deemphasizing regions with comparatively lower production numbers.*

*23. The method of claim 17, wherein developing the travel route further comprises emphasizing regions that are highly variable in amount of production in comparison to other regions more consistent in the amount of production.*

*24. The method of claim 17, wherein developing the travel route further comprises emphasizing regions that shift from growth of one type of crop to growth of another type of crop over a predetermined time period and deemphasizing regions that are comparatively more consistent with respect to the type of crop produced.*

*25. The method of claim 17, further comprising using satellite imagery for identifying the regions of interest.*

*26. The method of claim 17, further comprising using satellite imagery for developing the travel route.*

*27. The method of claim 17, wherein the collected image data comprise image data selected from the group consisting of photographic images, hyperspectral images, and infrared images.*

*28. The method of claim 17, further comprising calculating an image collection frequency for collecting the plurality of sequential image data during travel over the route.*

*29. The method of claim 17, further comprising providing the forecasted commodity production information to a customer selected from the group consisting of crop producer, crop seller, crop buyer, crop broker, crop distributor, elevator operator, commodities broker, futures buyer, futures seller, and futures broker.*

*30. The method of claim 17, further comprising setting a futures price for a specified crop or commodity based at least in part on the forecasted commodity production information.*

*31. A method for evaluating the destruction of an agricultural commodity, the method comprising:*

*identifying one or more geographical regions of interest that historically have been a site for production of the agricultural commodity;*

*obtaining a drone equipped with an image data acquisition system capable of collecting data;*

*tasking the drone to fly along a travel route that is developed so that the drone travels across the one or more geographical regions of interest;*

*tasking the drone to fly along the travel route over the one or more geographical regions of interest and having the drone collect a plurality of sequential image data over the one or more geographical regions of interest crossed over by the drone;*

*using an image processing device to analyze the collected image data to determine at least one of a type and a destruction of one or more commodities in the one or more geographical regions of interest; and*

*forecasting the destruction of the agricultural commodity in the one or more geographical regions of interest based on the at least one of the determined type and destruction;*

*wherein developing the travel route further comprises using an optimization algorithm to assess a cost of tasking the drone to travel across the travel route versus the cost of collecting the image data;*

*further comprising calculating an image collection frequency for collecting the plurality of sequential image data during travel of the drone over its travel route.*

*32. The method of claim 31, wherein developing the travel route further comprises consideration of one or more criteria that are predictive of the growth of at least one crop in the one or more geographical regions of interest.*

*33. The method of claim 31, wherein developing the travel route further comprises considering historical data indicative of variability of crop types in the one or more geographical regions of interest.*

*34. The method of claim 31, wherein developing the travel route further comprises considering weather data for at least a portion of the one or more geographical regions of interest.*

*35. The method of claim 31, wherein developing the travel route further comprises emphasizing regions of importance in terms of production and deemphasizing regions with comparatively lower production numbers.*

*36. The method of claim 31, wherein developing the travel route further comprises emphasizing regions that are highly variable in amount of production in comparison to other regions more consistent in the amount of production.*

*37. The method of claim 31, wherein developing the travel route further comprises emphasizing regions that shift from growth of one type of crop to growth of another type of crop over a predetermined time period and deemphasizing regions that are comparatively more consistent with respect to the type of crop produced.*

*38. The method of claim 31, further comprising using satellite imagery for identifying the one or more geographical regions of interest.*

*39. The method of claim 31, further comprising using satellite imagery for developing the travel route.*

*40. The method of claim 31, wherein the collected image data comprise image data selected from the group consisting of photographic images, hyperspectral images, and infrared images.*

*41. The method of claim 31, further comprising collecting the image data based on a factor selected from the group consisting of speed of the drone, desired resolution of the image data, altitude of the drone, type of photographic*

*equipment employed to collect the image data, and data storage capacity of one or more data storage media for storing the collected image data.*

*42. The method of claim 31, further comprising providing the forecasted commodity production information to a customer selected from the group consisting of crop producer, crop seller, crop buyer, crop broker, crop distributor, elevator operator, commodities broker, futures buyer, futures seller, and futures broker.*

*43. The method of claim 31, further comprising setting a futures price for a specified crop or commodity based at least in part on the forecasted commodity production information.*

* * * * *